United States Patent
Tsuchiya et al.

(10) Patent No.: US 7,359,043 B2
(45) Date of Patent: Apr. 15, 2008

(54) PATTERN INSPECTING METHOD AND PATTERN INSPECTING APPARATUS

(75) Inventors: Hideo Tsuchiya, Kawasaki (JP); Yoshihide Kato, Tokyo (JP); Kazuto Matsuki, Tokyo (JP); Yasushi Sanada, Yokohama (JP); Riki Ogawa, Yokohama (JP); Takuro Nagao, Kawasaki (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 859 days.

(21) Appl. No.: 10/743,830

(22) Filed: Dec. 24, 2003

(65) Prior Publication Data

US 2004/0184652 A1 Sep. 23, 2004

(30) Foreign Application Priority Data

Dec. 27, 2002 (JP) .............................. 2002-382395

(51) Int. Cl.
*G01N 21/00* (2006.01)
*G06K 9/00* (2006.01)

(52) U.S. Cl. ..................... 356/237.1; 356/394; 382/154
(58) Field of Classification Search .. 356/237.1–237.5, 356/394; 382/140, 144–145, 147, 154, 149; 716/21, 82
See application file for complete search history.

(56) References Cited

U.S. PATENT DOCUMENTS

| 4,365,163 | A | * | 12/1982 | Davis et al. | ............. | 250/491.1 |
|---|---|---|---|---|---|---|
| 5,404,410 | A | * | 4/1995 | Tojo et al. | ................... | 382/144 |
| 5,602,645 | A | * | 2/1997 | Tabata et al. | ................ | 356/394 |
| 6,229,331 | B1 | * | 5/2001 | Kuwabara | .................... | 324/765 |
| 6,285,783 | B1 | * | 9/2001 | Isomura et al. | ............. | 382/147 |
| 6,603,875 | B1 | * | 8/2003 | Matsuyama et al. | ........ | 382/145 |
| 6,883,160 | B2 | * | 4/2005 | Tsuchiya et al. | ............... | 716/21 |
| 6,965,687 | B2 | * | 11/2005 | Sawa et al. | .................. | 382/149 |

FOREIGN PATENT DOCUMENTS

| JP | 10-282008 | 10/1998 |
|---|---|---|
| JP | 2002-310929 | 10/2002 |

OTHER PUBLICATIONS

U.S. Appl. No. 10/642,760, filed Aug. 19, 2003, Tsuchiya et al.

* cited by examiner

*Primary Examiner*—Sang H. Nguyen
(74) *Attorney, Agent, or Firm*—Oblon, Spivak, McClelland, Maier & Neustadt, P.C.

(57) ABSTRACT

A pattern inspecting method, comprising preparing a sample having a first and a second inspection regions and an imaging device having a plurality of pixels, scanning the first inspection region to a first direction using the imaging device to obtain a first measurement pattern representing at least parts of the first inspection region, scanning the second inspection region to the first direction using the imaging device to obtain a second measurement pattern representing at least parts of the second inspection region, comparing the first measurement pattern and the second measurement pattern with each other to determine presence or absence of a defect formed on the sample, and controlling a scanning condition for scanning a pattern of the second inspection region by the imaging device so as to keep the same with the scanning condition when the pattern of the first inspection region is scanned by the imaging device.

17 Claims, 8 Drawing Sheets

PATTERN INSPECTING METHOD AND PATTERN INSPECTING APPARATUS

CROSS-REFERENCE TO RELATED APPLICATIONS

This application is based upon and claims the benefit of priority from the prior Japanese Patent Application No. 2002-382395, filed Dec. 27, 2002, the entire contents of which are incorporated herein by reference.

BACKGROUND OF THE INVENTION

1. Field of the Invention

The present invention relates to a pattern inspecting apparatus for inspecting a pattern defect of a sample on which a fine pattern is formed such as a photo mask for use in a process for manufacturing a semiconductor integrated circuit.

2. Description of the Related Art

In a process for manufacturing a large scale integrated circuit (LSI), an optical reduction exposure device (stepper) for circuit pattern transfer uses a photo mask having a circuit pattern magnified to 4 to 5 times as an original block. A request for integrity (pattern precision and no defect, etc.) for this photo mask is very higher and higher year by year. In recent years, a pattern transfer is carried out in the vicinity of a critical resolution of the stepper with super-fining and high integration, and a photo mask with high precision is used as a key of manufacturing a device. Thus, development of devices for inspecting such a defect is actively underway, and such devices are practically used.

Among them, the improvement of performance of a mask defect inspecting apparatus for detecting a defect of a super-fine pattern is essential for the improvement of the yield of short-term development and manufacture of an advanced semiconductor device.

As a conventional mask defect inspecting method, there is provided a method (a die-to-die comparison scheme) for scanning and observing two chips on which the same pattern has been depicted by a sensor having a plurality of pixels, respectively, and comparatively detecting a difference between both of these chips in accordance with a proper defect detecting algorithm (for example, refer to Jpn. Pat. Appln. KOKAI Publication No. 10-282008).

In order to efficiently fetch a chip image, it is preferred to penetrate and scan a plurality of dies which continuously exist in a stripe lengthwise direction at one time, and acquire an image. Because of this, there is employed a method for continuously photographing images, fetching the photographed images in a memory, and comparing images on the memory with each other at the same time as the fetching or after completing fetching on a one stripe by one stripe basis.

The images fetched by a sensor is provided as two-dimensional multi-gradation digital images when one pixel of the sensor is defined as a unit (mesh). On the other hand, a dimension of each die (chip) or gap dimension between the dies and an image pixel dimension do not have a relationship of integer multiples. Thus, if a first die image and a second die image are superimposed on each other on a pixel by pixel basis, each image pixel appears as if a pattern displacement has occurred.

Conventionally, in order to practically carry out die comparison, one die image is corrected so as to eliminate this pattern displacement. This method is provided for cutting a mesh again on a principle of weighting one die image by a plurality of image pixels, and obtaining a weight average or the like, and for comparison of the pixels of die images. A defect determination algorithm for correcting the positions of pixels of nominal die images, and then, making die-to-die comparison, has been applied.

In cutting the mesh again, interpolation of pixels of die images is carried out, and then, a type of smoothing processing is applied. Therefore, there has been a side effect that an image whose pattern displacement has been corrected blurs (is averaged) principally, an essential defect signal for quantization error, in particular, a signal intensity of a fine defect is dulled, or a profile of a pattern edge is changed, and there has been a limitation to the improvement of inspection sensitivity.

Further, even when dies exist repeatedly in an inspection stripe widthwise direction (in a Y direction), a dimensional relationship between a mesh and a die of an image pixel does not always have a relationship of integer multiples, and thus, there is a problem similar to an X direction. Therefore, the fact that an image produced in a process for cutting the mesh in the Y direction again has been a limitation to the improvement of inspection sensitivity.

BRIEF SUMMARY OF THE INVENTION

A pattern inspecting method according to an aspect of the present invention, comprises: preparing a sample having a first and a second inspection regions and an imaging device having a plurality of pixels; scanning the first inspection region to a first direction using the imaging device to obtain a first measurement pattern representing at least parts of the first inspection region; scanning the second inspection region to the first direction using the imaging device to obtain a second measurement pattern representing at least parts of the second inspection region; comparing the first measurement pattern and the second measurement pattern with each other to determine presence or absence of a defect formed on the sample; and controlling a scanning condition for scanning a pattern of the second inspection region by the imaging device so as to keep the same with the scanning condition when the pattern of the first inspection region is scanned by the imaging device.

A pattern inspecting apparatus according to still another aspect of the present invention, comprises: an emitting unit configure to emit to a sample having a first inspection region on which a first pattern is formed and a second inspection region on which a second pattern is formed; an imaging device that have detecting unit that detect images from the samples; a position recognizing unit configure to recognize a position of the sample with respect to the detecting unit; a signal output unit configure to output a signal to output a relative signal according to a relative movement between the sample and the detecting unit; and a control unit configure to control a scanning condition for scanning a pattern of the second inspection region by the imaging device so as to keep the same with the scanning condition when the pattern of the first inspection region is scanned by the imaging device.

DETAILED DESCRIPTION OF THE INVENTION

An embodiment according to the present invention will be described herein below with reference to the drawings.

First Embodiment

Figure 1:
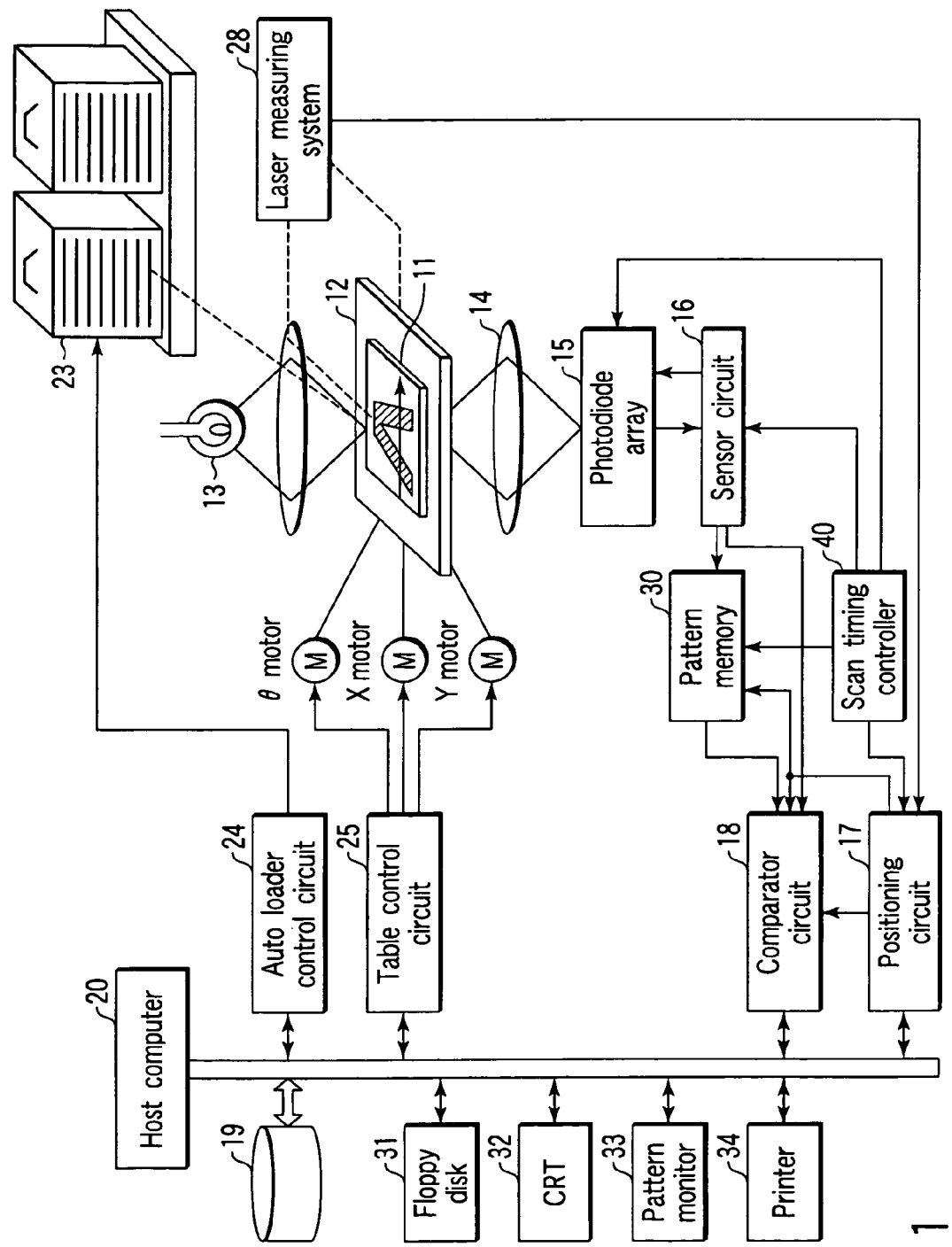
FIG. 1 is a diagram showing a schematic configuration of a pattern inspecting apparatus according to a first embodiment of the present invention.

FIG. 1 is a diagram showing a schematic configuration of a pattern inspecting apparatus according to a first embodiment of the present invention.

Figure 2:
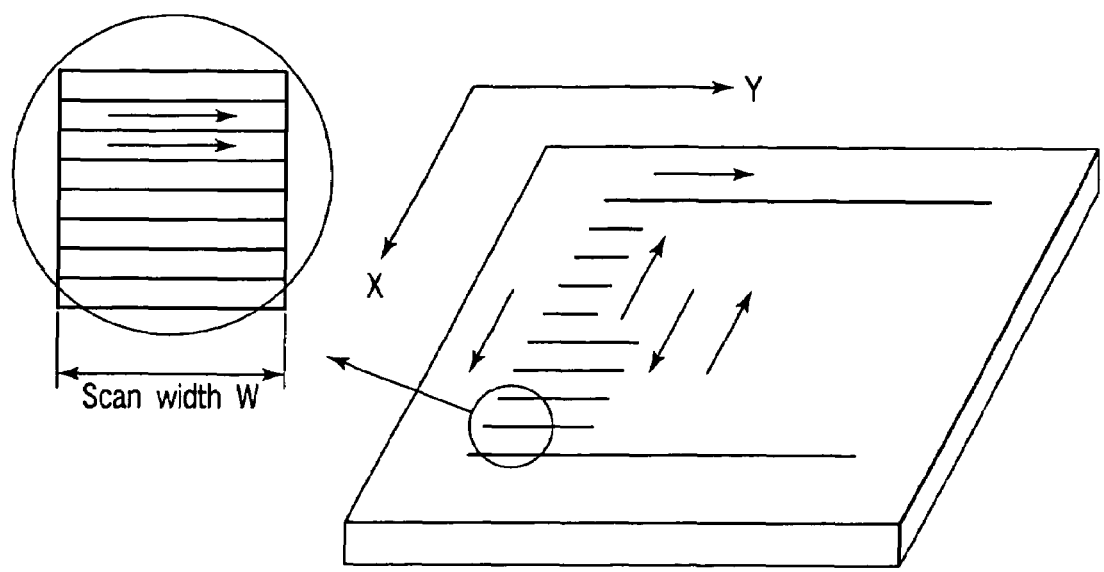
FIG. 2 is an illustrative view of an inspection stripe of a photo mask.

In this apparatus, a pattern formed in a photo mask (a sample) 11 is magnified by using a microscope or the like, this magnified pattern is divided into thin inspection stripes shaped in a stripe of paper having a width (W) of about 200 μm as shown in FIG. 2, an XYθ table 12 is controlled by each XYθ motor such that these inspection stripes are continuously scanned, and inspection is executed.

The photo mask 11 is placed on the XYθ table 12, and is moved in the XYθ direction by movement of the table 12. A light source 13 is set upward of the mask 11, and a pattern formed on the mask 11 is illuminated by this light source 13. The light having transmitted the mask 11 is made incident to a photodiode array 15 via a magnification optical system 14. Therefore, an optical image of the pattern of the mask 11 is formed on the photodiode array 15. On the photodiode array 15, a plurality of sensor pixels are arranged in a direction orthogonal to a scanning direction during inspection.

The optical image of the pattern formed on the photodiode array 15 is converted photo-electrically by means of the photodiode array 15, and further, is A/D converted by means of a sensor circuit 16. Measurement pattern data outputted from the sensor circuit 16 is sent to a pattern memory 30 or a comparator circuit 18 together with data indicating a position of the photo mask 11 on the XYθ table 12 outputted from a positioning circuit 17. Timing control of an output of the measurement pattern data from the sensor circuit 16 is carried out by a scan control signal outputted from a scan timing controller 40.

The pattern memory 30 has a capacitance capable of storing the measurement pattern data on a stripe full length during stripe inspection. Further, while in stripe inspection, even on the way of pattern storage, a first-half pattern of the stripe which has already been stored is read out and writing of a latter-half pattern of the stripe being newly fetched are configured so as to enable parallel operation.

The comparator circuit 18 compares the measurement pattern data stored in the pattern memory 30 with the measurement pattern data inputted from the sensor circuit in accordance with a proper algorithm. When these items of data do not coincide with each other, it is determined that a defect occurs.

In the figure, reference numeral 23 denotes an auto loader; 24 denotes an auto loader control circuit; 25 denotes a table control circuit; 31 denotes a floppy disk; 32 denotes a CRT; 33 denotes a pattern monitor; and 34 denotes a printer.

Figure 3:
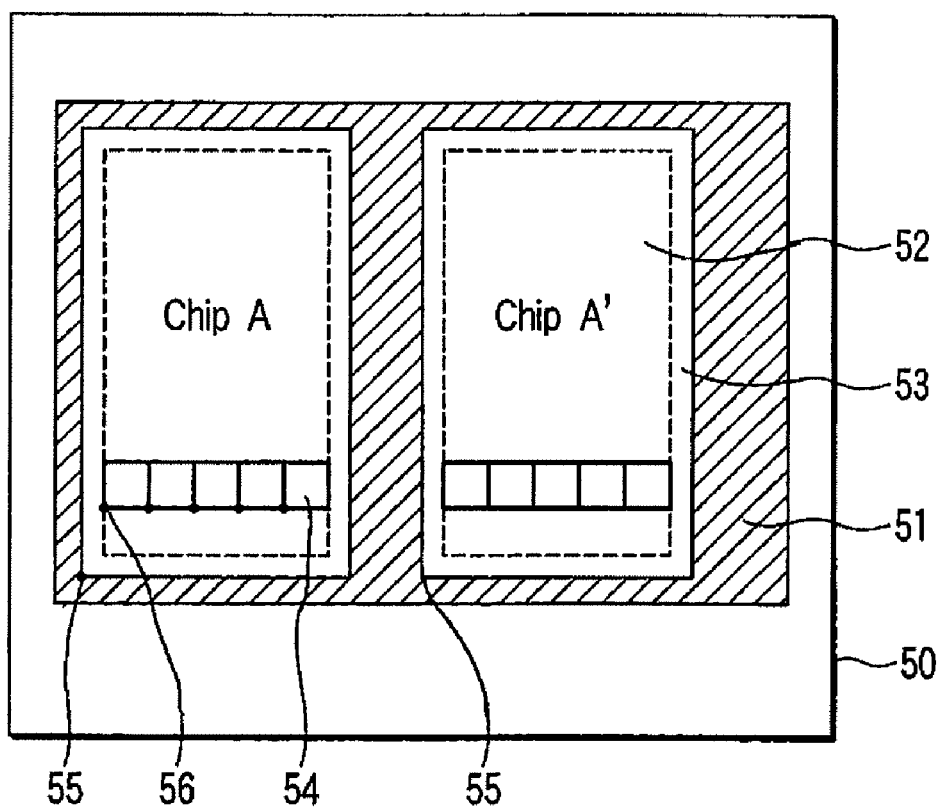
FIG. 3 is a plan view showing a concept which illustrates a configuration of a pattern depicted in a general photo mask.

FIG. 3 is a conceptual view showing a configuration of a pattern depicted on a general photo mask. Two identical chips (dies) are depicted on one mask 50 (photo mask 11), and a repetition pattern is further depicted in units called cells inside of the chips. The pattern formed on the mask 50 is divided into a peripheral pattern 51 and a main pattern 52. The main pattern 52 is further divided into a logic controller unit (peripheral circuit) 53 and a memory unit (cell) 54. In the figure, reference numeral 55 denotes a chip origin, and 56 denotes a cell origin.

In the case of such a two-chip configuration, it is general that this configuration is allocated in a relationship moved in parallel in the X direction or Y direction. Although not shown, even in the case where four or six chips are formed on one mask, it is common that these chips are repeatedly allocated in a column arrangement shape on the X and Y axes.

In the present embodiment, a description will be given with respect to a case in which two identical chips called chips A are allocated in a lengthwise direction of inspection stripes. For convenience, a first chip is expressed as A, and a second chip is expressed as B.

Now, a defect inspecting operation according to the present embodiment will be described in more detail.

Figure 4:
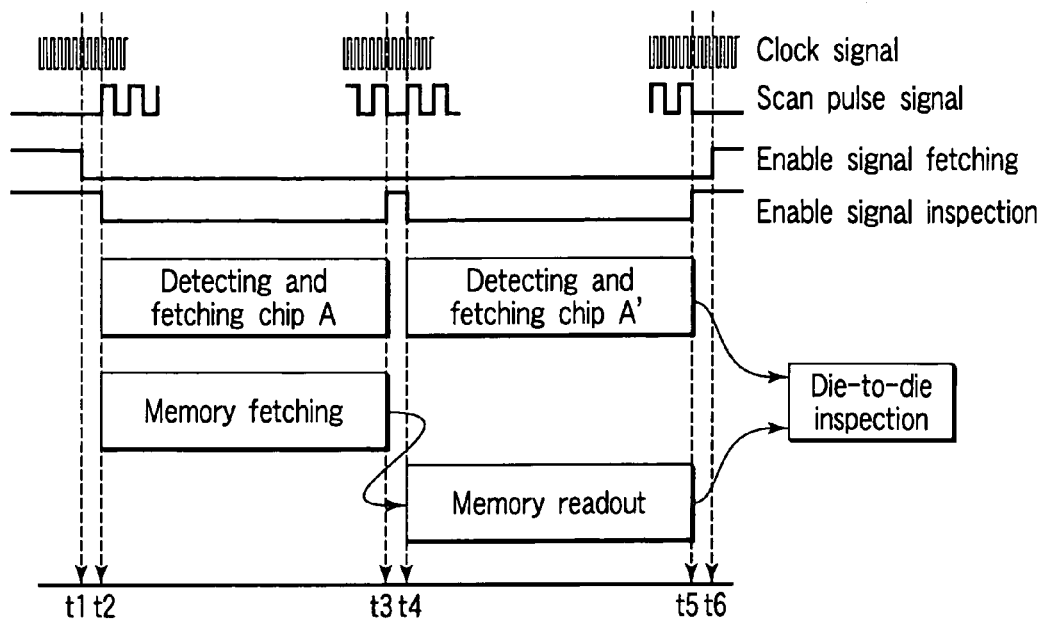
FIG. 4 is a timing chart for explaining a process for one inspection stripe according to the first embodiment.

FIG. 4 is a timing chart for explaining a process for one inspection stripe in the inspecting apparatus of the present embodiment. In a chip configuration of a mask illustrated here, it is assumed that two chips are allocated in the lengthwise direction (X direction) of the inspection stripes as shown in FIG. 3.

First, as in the conventional apparatus, by using an observation optical system such as a microscope, an operator indicate the start coordinate of each chip and an approximate chip size while visually checking an inspection mask. The observation optical system used here is different from detection optical systems 14 and 15 for use in actual inspection.

Next, finally, the coordinate of each chip is specified on an image detected by the detection optical systems 14 and 15 using the same sensor as that in image fetching for actual inspection. The allocation coordinate of each chip and the coordinate on an actual mask are provided so as to be handled as a stage coordinate by a laser measuring system 28.

Each chip has a rectangular external shape, and a coordinate to be specified is provided as the start coordinate and end coordinate of a first chip. These coordinates are specified in a diagonal line shape, whereby the start point and end point in the XY direction of one chip are found. The start coordinates of the second and subsequent repeated chips are inputted. This input may be made by a method for specifying the start coordinates of chips on one by one chip basis or a scheme of specifying the start coordinate of a furthermost chip from a first chip and specifying the number of repetitions in batch between the first chip and the farthermost chip.

The operator indicates to an apparatus the defect detection sensitivity of the inspection or the magnification of the detection optical system and a comparison algorithm as required, and causes the apparatus to start inspection.

This apparatus sets an inspection range such that each specified chip is covered, and drives a stage at a constant speed in the X direction. A slight runway distance is required to drive the stage from a stopped state at a constant speed. Therefore, the runway distance is set so as to approach the inspection interval of chip A after running at a constant speed. Note that the position of the XYθ table 12 being driven is measured by the laser measuring system 28 and positioning circuit 17.

The scan timing controller 40 sends a fetch enable signal to the photodiode array 15 at time "t1". The photodiode array 15 enters a standby state by the fetch enable signal.

Further, a fetch enable signal 62 is provided as a signal which permits an operation of one stripe and which is generated by the scan timing controller 40. In FIG. 4, a Low level is expressed in an active state. Even if a delimit of chips exists in the middle of stripe, the fetch enable signal 62 maintains an active state. When a full length of stripe terminates, an inactive state (High level) is restored. In the fetch enable signal 62, when the stage approaches the start and end positions of the chip, a logic state changes. Strictly, a state change is established on a rise edge of a circuit operation clock 60 immediately after the fetch enable signal 62 has changed.

Figure 5:
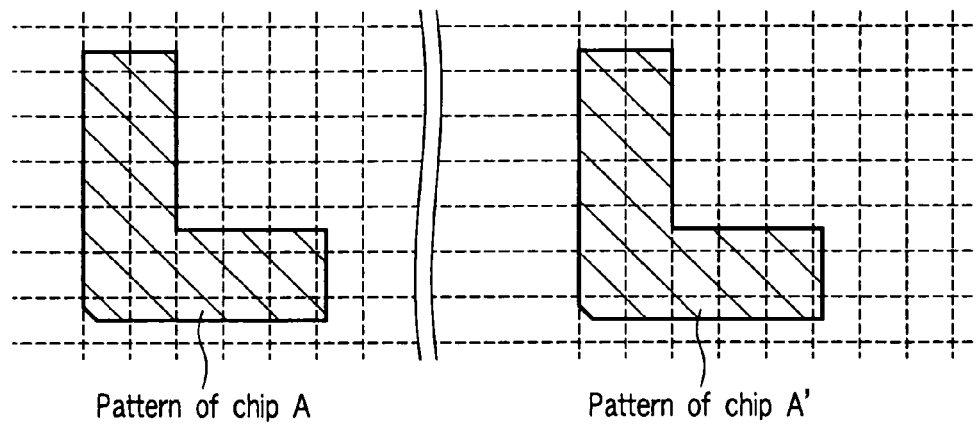
FIG. 5 is a view showing a relationship between a pattern in a die region and an image pixel during image fetching according to the first embodiment.

At time "t2", as shown in FIG. 5, when an image pixel of the photodiode array 15 approaches chip A, an inspection enable signal generated in the scan timing controller 40 becomes active. A positional relationship between a stage coordinate and a sensor pixel at time "t2" is recorded. In FIG. 5, the dotted line in a vertical direction indicates a position at which a scan pulse is generated, and the dotted line in a horizontal direction represents a delimit of image pixels. The image pixel used here denotes a pixel of an image acquired by the photodiode array 15.

For convenience of explanation, FIG. 5 shows that the mesh of image pixels coincides with the start position of a graphics in the X direction (left side edge of the graphics). However, in actuality, the scan timing controller 40 adjusts a scan (operation) timing so as to record a phase state (degree of displacement) of an image pixel on which a pattern of chip A has been picked up as an image and so as to pick up a graphic pattern of chip A' as an image in a similar phase state (degree of displacement).

In general, a graphic pattern requiring inspection exists in chips, and the coordinate range taught by teaching the coordinate of each chip is inspected. However, a graphic pattern is not always allocated from a position completely coincident with the start coordinate of each chip. Therefore, even if the degrees of approach between the image pixel and the chip are made coincident with each other, the approach phases of the image pixels are not always coincident with each other with respect to a first graphics.

The inspection enable signal 61 permits actual sensor scan operation, and in FIG. 4, a Low level is expressed in an active state. This signal temporarily returns to an inactive state (High level) in the case where the delimit of chip exists on the way of stripe, and this signal becomes an active state when it approaches chip A'. Strictly, in this signal as well, a state change is established on a rise edge of the circuit operation clock 60 immediately after this signal has changed.

When the inspection enable signal then becomes active at time "t2", the scan timing controller 40 outputs a scan pulse.

Assuming that the speed of a stage running at a constant speed is V [mm/s] and the image pixel is S [nm] in square, an internal of a general scan pulse is obtained as S/V [μs]. In the case of the inspecting apparatus of this type, a scan pulse becomes active in a cycle of about 10 μs to 25 μs in interval. The circuit operation clock 60 is sufficiently fast as compared with the scan pulse frequency, and is about 25 MHz to 50 MHz. The scan pulse frequency and the circuit operation clock frequency determine a relative relationship in accordance with a predetermined rule. A description is omitted here.

The scan timing controller 40 outputs a scan pulse to the sensor circuit 16, positioning circuit 17, comparator circuit 18, and pattern memory 30. The scan pulse is inputted to the photodiode array 15 via the sensor circuit 16.

When a scan pulse outputted at an equal time interval is outputted, image data of an inspection stripe shaped in stripe of paper is acquired (in a time synchronizing scheme), and the image data is stored in the pattern memory as measurement pattern data. The image acquired by the photodiode array 15 is provided as image data formed in a two-dimensional grid shape.

The sequentially acquired measurement pattern data are stored in continuous memory addresses. At this time, it is preferable to add information which can be referred to a memory address corresponding to delimit of chips.

When the image pixel caused by the photodiode array 15 approaches an end edge of chip A at time "t3", the scan timing controller 40 makes the inspection enable signal inactive, and stops image acquisition from chip A.

The scan timing controller 40 carries out management such that a phase relationship (positional relationship) between a stage coordinate and a sensor pixel of the scan fetching start (t4) of the chip when the pixel approaches chip A' similar to time "t2". Here, the simplest method compares the X coordinate during run and the start X coordinate of chip A' with each other, and makes the inspection enable signal active at a time when the sensor pixel of the photodiode array 15 approaches the start X coordinate of chip A'.

When the sensor pixel of the photodiode array 15 approaches the start X coordinate of chip A' at time "t4", the scan diode controller 40 makes an inspection enable signal active, and generates and outputs a scan pulse. Between times t3 to t4, the fetch enable signal is active, and the photodiode array 15 is in an active state. In addition, a scan pulse is not outputted.

Between times t4 and t5, actual die-to-die comparison is carried out. A method for carrying out die comparison inputs to the comparator circuit 18 the measurement pattern data acquired from chip A'. In parallel to this, measurement pattern data are sequentially read out from memory addresses corresponding to the delimit of chips recorded in advance from the pattern memory 30, and the read out data are inputted to the comparator circuit 18. Then, the comparator circuit 18 compares two items of data with each other, and carries out defect determination. The comparator circuit 18 determines that a defect exists in the case where two items of the compared measurement pattern data do not coincide with each other as a result of the comparison in accordance with a proper algorithm.

Image displacement between chips A and A' is corrected during image obtaining, and thus, alignment is not required in principle during image comparison. However, because of a pattern displacement caused by stage running swing in the stripe widthwise direction (Y direction), a local displacement caused by the non-uniformity of the stage speed in the stripe advancing direction, a tilt or rotation of a pattern generated all over the sample, a slight displacement or angle error caused by expansion/contraction and the like, it is considered that there occurs a state in which a pseudo defect (a phenomenon in which a defect which is not essentially determined as is) cannot be avoided in a comparison determination algorithm provided. Thus, for example, there would be a case in which correction means capable of correcting dimensions less than one image pixel is required.

When the sensor pixel of the photodiode array 15 reaches the end X coordinate of chip A' at time "t5", the inspection enable signal is made inactive. The generation of a scan pulse, acquisition of an image from chip A', and die-to-die comparison are terminated. Then, at time "t6", the fetch enable signal is established in an inactive state.

In the case where three or more chips are repeated in the X direction, a scan pulse generation timing adjustment similar to processing between the completion of the fetching of chip A described above and the approach to chip A' is carried out.

In the above-described method, the measurement pattern data for one stripe of a plurality of chips for carrying out chip (die) comparison can be fetched.

According to the present embodiment, during fetching, a relationship between the pattern in chip A and the image pixel is made coincident with a relationship between the pattern in chip A' and the image pixel. Thus, a process for correcting a position of a nominal image pixel by means such as weight average of a plurality of image pixels when repetition chips (dies) are inspected by die-to-die comparison becomes unnecessary. As a result, the detection sensitivity of the inspecting apparatus can be improved because a defect can be determined without blurring of the image obtained by the sensor or attenuation of a signal of a defect pattern unit.

The foregoing description gives a case in which a stage is moved in a FWD direction, thereby fetching an image. In the case where a stage is moved in a BWD direction, an n-th chip of n chips formed in the X direction is fetched in a memory as a reference of die comparison, and sensor image data of an (n−1)-th chip is fetched. At the same time, a pattern memory is read out, measurement pattern data of the n-th chip and the (n−1)-th chip are fed in parallel to the comparator circuit 18, and defect determination is made. Subsequently, comparisons from the n-th chip to the first chip are sequentially operated.

Figure 6:
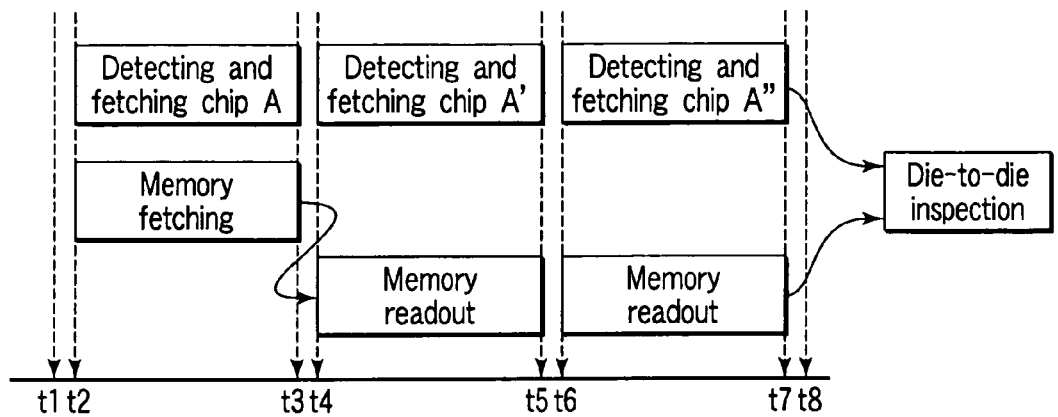
FIG. 6 is a timing chart for explaining the process for one inspection stripe according to the first embodiment.

In the case where three chips are configured in the X direction, as shown in FIG. 6, when measurement pattern data for chip A" is fetched, measurement pattern data for chip A is read out from the pattern memory again. Then, measurement pattern data for a third chip is fed in parallel to the comparator circuit 18, and defect determination is made.

In the case where four chips are configured in the X direction as well, measurement pattern data for chip A and measurement pattern data for a chip being fetched are fed in parallel to the comparator circuit 18, and defect determination is made.

In comparing chips repeated in the direction of stripe of paper (Y direction), the inspection stripe position (Y coordinate) is adjusted based on the start Y coordinate of each chip, and the degrees of approach of the image pixels are made coincident with each other.

Figure 7:
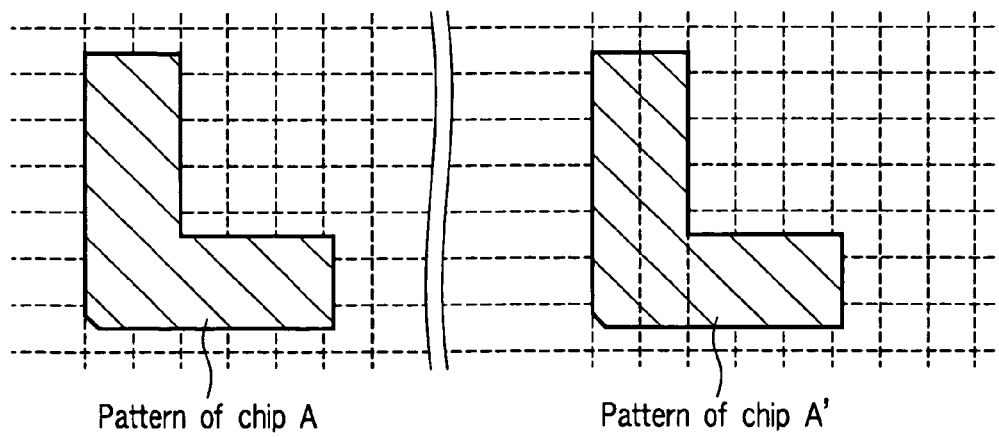
FIG. 7 is a view showing a relationship between the pattern in the die region and the image pixel during image fetching according to the first embodiment.

In the above described embodiment, a scan pulse has been generated in a time synchronizing scheme. However, a scan pulse may be generated in a position synchronizing scheme as shown in FIG. 7. In FIG. 7, the dotted line in a vertical direction indicates a position at which a scan pulse has been generated, and the dotted line in a horizontal direction represents a delimit of image pixels. A scan pulse is generated every time the XYθ table 12 moves in the X direction by image pixel dimensions. In the X coordinate in which a scan pulse is generated, a memory fetching start X coordinate (point "t2" in FIG. 4) of chip A is defined as a start point, and is defined for each image pixel dimension in a bi-direction (±X direction) on the X coordinate. In the X coordinate in which a scan pulse is generated, a memory fetching start X coordinate (point "t4" in FIG. 4) for chip A' is defined as a start point, and is defined for image pixel dimension in a bi-direction (±X direction) on the X coordinate. Until memory fetching of chip A has terminated, a scan pulse is generated for each scan pulse generation point defined when the fetching start X coordinate of chip A is defined as a reference. Between the end of memory fetching of chip A and the end of memory fetching of chip A', a scan pulse is generated for scan pulse generation point defined when the fetching start X coordinate of chip A' is defined as a reference.

In the case of the position synchronizing scheme, even when the table 12 is not at a constant speed, an image formed in a grid shape coincident with the memory fetching start X coordinate can be fetched.

The memory fetching start X coordinate of chip A may not be coincident with an end of the image pixel. In this case, a positional relationship between the region fetching start X coordinate of chip A' and the pixel image (sensor pixel) can be simulated as a positional relationship between the memory fetching start X coordinate of chip A and the image pixel.

In the case of the position synchronizing scheme, even if a scan pulse is outputted, when the inspection enable signal is in an inactive state, an image is fetched for each scan pulse. However, the fetched image is not sent to a memory or a comparator circuit, and inspection is not carried out. Between times t1 to t2, t3 to t4, and t5 to t6 at which the inspection enable signal is inactive, even if a scan pulse is outputted, an image fetched by the sensor is not actually subjected to defect determination for inspection during running between chips. A defect detecting operation for inspection is carried out while the inspection enable signal 61 is in an active state (Low level).

Second Embodiment

In the above-described first embodiment, between times t2 and t3, the measurement pattern data obtained from chip A is stored in the pattern memory 30. Then, between times t4 and t5, the measurement pattern data obtained from chip A' is obtained, and the corresponding measurement pattern data is read out from the memory. Then, two items of measurement pattern data are sent in parallel in the comparator circuit 18, and defect determination is made.

In the case where the comparison and determination processing in the comparator circuit 18 is sufficiently fast as compared with an image fetching speed, there is no problem. However, in the case where the comparison and determination processing in the comparator circuit 18 is slower than the image fetching speed, there occurs a "timing error" indicating that the comparison processing is slow. In the case where this error has been sensed, the comparison processing is temporarily canceled, and a stage running speed is reduced in order to reduce an inspection speed. Alternatively, in order to reduce a load on the comparator circuit 18, processing for reducing an inspection stripe width is applied, and retry processing, i.e., retrying; inspection of the stripe is carried out.

In the present embodiment, the pattern memory 30 has a capacity capable of storing the measurement pattern data on a full length of the stripes of all chips in stripe inspection. In addition, even during stripe inspection and on the way of pattern storage, writing of measurement pattern data being newly fetched and readout of the measurement pattern data which has been stored are configured so as to enabled in parallel. Further, it becomes possible to read out measurement pattern data which has been stored at that inspection stripe before the chip being currently fetched.

With this configuration, measurement pattern data on chip A is stored from the stripe head in the pattern memory 30. Measurement pattern data for an image of chip A' is started to be stored in the pattern memory 30. At the same time, measurement pattern data for chip A and measurement pattern data for chip A' are read out in parallel from the pattern memory 30, and is sent in parallel to the comparator circuit 18, and then, defect determination is made.

In this configuration, readout from the pattern memory 30 is carried out according to advancement of the comparison and determination processing in the comparator circuit 18. Therefore, even when the comparison and determination processing in the comparator circuit 18 is slower than the chip image fetching speed, writing into the pattern memory 30 is merely preceded, and storage and comparison processing for the measurement pattern data is advanced. Even if the image comparison and determination processing for an image of chip A' in the comparator circuit 18 does not complete at a time when fetching of an image of chip A' has terminated, stage running continues, and then, fetching of images of third and subsequent chips can be advanced. The comparison and determination processing in the comparator circuit 18 advances later. At a time when images of a plurality of chips for one stripe have been fetched, the end of the comparison and determination processing in the comparator circuit 18 is waited, and the next stripe can be advanced.

Figure 8:
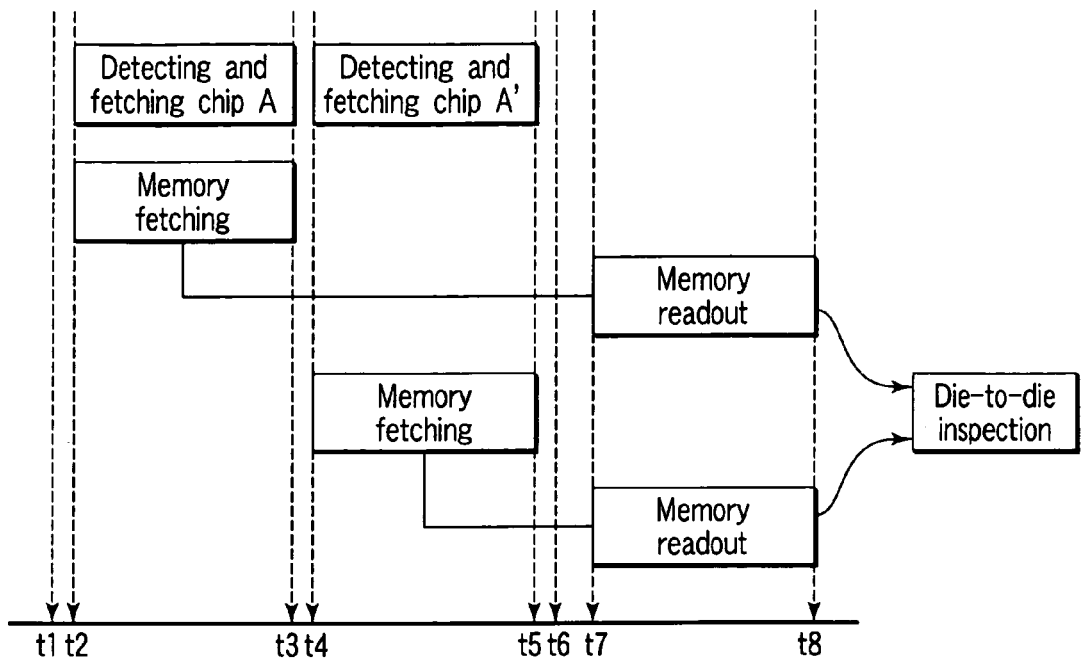
FIG. 8 is a view showing a relationship between a pattern in a die region and an image pixel during image fetching according to a second embodiment of the present invention.

Moreover, as shown in FIG. 8, it is possible to carry out comparison and determination by reading out measurement data from the pattern memory 30 after fetching the full length of the inspection stripe.

Third Embodiment

In the above-described first and second embodiments, even if inspection reference data (reference pattern data) for inspection is absent, die-to-die comparison can be carried out. However, as described below, even in the case where design data during sample generation is read, and die-to-database inspection is shared, a relationship between an image pixel position and a pattern position can be established on a chip by chip basis.

First, a process for an operator to specify the start and end coordinates of a chip by using an observation optical system such as a microscope while visually checking a mask is automatically executed by utilizing a feature of a data description configuration of design data.

Figure 9:
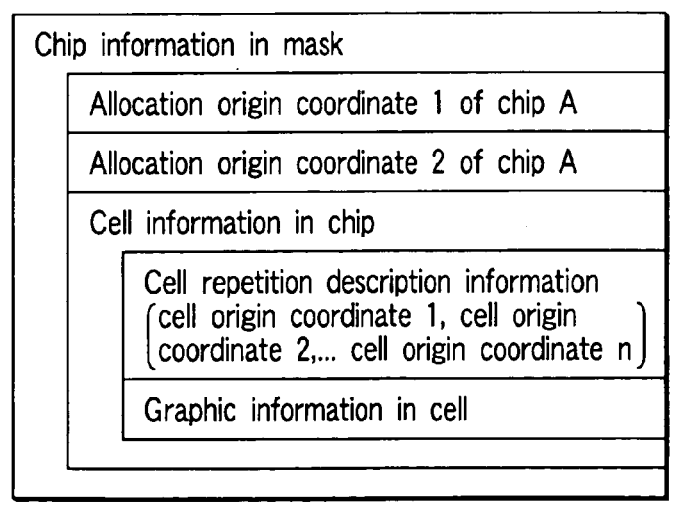
FIG. 9 is a view showing a structure of design data.

Design data is obtained in definition of chips and definition of cells or in a hierarchical structure, as shown in FIG. 9. In this example, the chip allocation coordinate is defined as a left lower apex of the chip as shown in FIG. 3. With such a data structure, the chip of this mask can be read as being allocated at two units such as "allocation original coordinate 1 of a first chip" and "allocation origin coordinate 2 of a second chip" from a state of the chip allocation coordinate.

Thus, the coordinate can be read similarly with respect to the start coordinate of the first chip, the coordinate for starting die-to-die comparison at the start of fetching the second chip, a unit at which regions of these first and second chips terminate, and a gap is provided, and the third and subsequent chips. Then, up to the end coordinate for one stripe inspection can be automatically recognized without teaching of the operator.

Lately, it is desired that the introduction of LSI be highly integrated, and concurrently, it is desired that the resolution of an optical transfer device be further improved. As means for achieving this requisition, there is proposed that a phase shift pattern utilizing light interference is provided in a photo mask. That is, in the photo mask shown in FIG. 3, it is required to form a phase shift pattern at a unit requiring forming a fine pattern, of these main patterns 52.

When a mask using a phase shift pattern is inspected, a specific phenomenon which does not exist conventionally occurs such as a change rate of a light quantity becoming rapid at a pattern edge unit depending on a wavelength of inspection light. In a die-to-database comparison system, there occurs a case in which reference data will coincident with a sensor image cannot be generated.

In die-to-die comparison, the specific behaviors of pattern edge units depending on a wavelength of such inspection light exists on both of the reference pattern data and a target pattern upon comparison. Thus, this behaviors are offset, a pseudo defect is avoided, and it becomes possible to detect an essential defect. On the other hand, in the case where the same defects exist on two chips, there is a disadvantage that the defect unit cannot be detected.

In this manner, it is discussed that the die-to-die scheme and the die-to-database scheme are used together because of the presence of their respective advantages and disadvantages (Japanese Patent Application No. 2002-240858).

Figure 10:
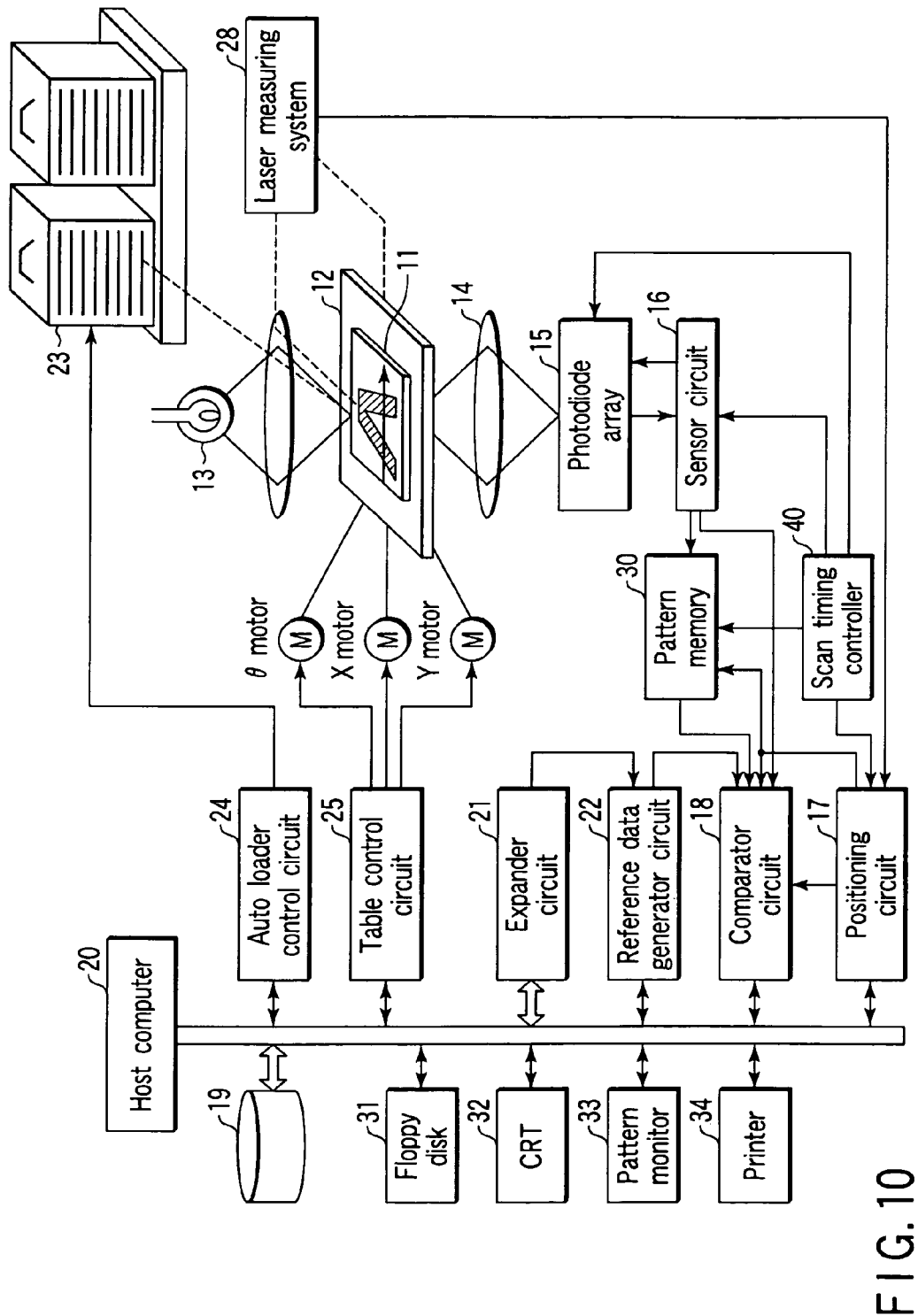
FIG. 10 is a view showing a schematic configuration of a pattern inspecting apparatus according to a third embodiment of the present invention.

FIG. 10 shows a configuration of a pattern inspecting apparatus for carrying out die-to-die comparison and die-to-database comparison in the comparator circuit 18. The pattern inspecting apparatus shown in FIG. 10 further comprises an expander circuit 21 and a reference data generator circuit 22 with respect to the pattern inspecting apparatus shown in FIG. 1.

The design data used during pattern formation for the photo mask 11 is read out from a magnetic disk 19 to the expander circuit 21 through a control computer 20. In the expander circuit 21, the design data is expanded to bit pattern data, and this bit pattern data is sent to the reference data generator circuit 22.

In the reference data generator circuit 22, proper filter processing is applied to bit pattern data for a graphics sent from the expander circuit 21, whereby multi-valued reference pattern data is generated. A filter in the reference data generator circuit 22 simulates blurring generated by the resolution feature of the magnification optical system 14, an aperture effect of the photodiode array 15, an interference between the adjacent image pixels and the like. That is, since the measurement pattern data obtained from the sensor circuit 16 is established in a state in which this blurring has occurred, filter processing is applied to design side data as well, thereby obtaining coincidence with measurement pattern data.

Figure 11:
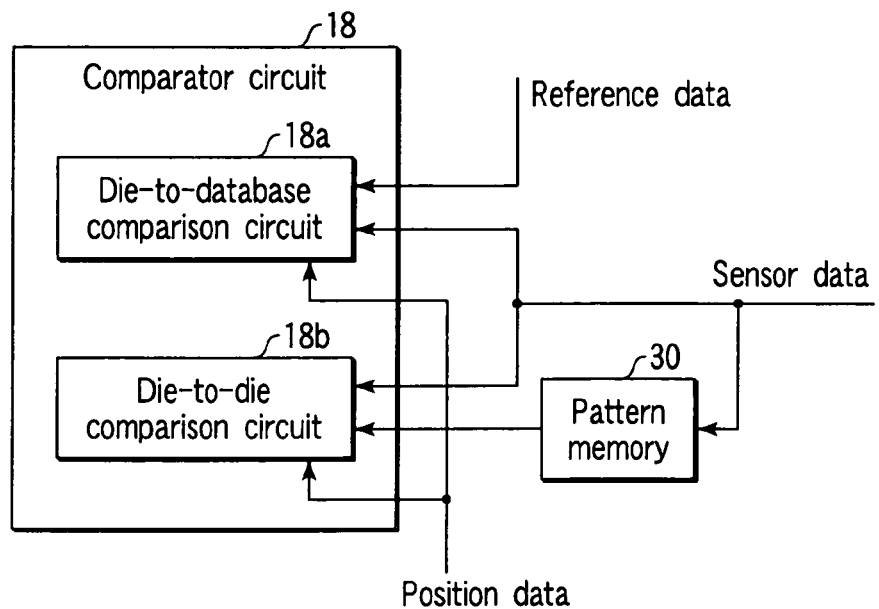
FIG. 11 is a block diagram depicting a configuration of a comparator circuit used in the pattern inspecting apparatus of FIG. 10.

Furthermore, in the comparator circuit 18, as shown in FIG. 11, a die-to-database comparison circuit 18a and a die-to-die comparison circuit 18b are provided. The reference data obtained by the reference data generator circuit 22 and the sensor data obtained by the sensor circuit 16 are inputted to the die-to-database circuit 18a. One item of sensor data and another item of sensor data temporarily stored in the pattern memory 30 and read out after a predetermined condition has been established are inputted to the die-to-die comparison circuit 18b.

The comparator circuit 18 has two inspection modes, a die-to-database comparison scheme and a die-to-die comparison scheme, and either or both are carried out at the same time.

The comparator circuit 18 detects a defect by both of the die-to-database comparison and die-to-die comparison during a period when die-to-die comparison is used together. However, it is preferable that these comparisons apply different defect determination conditions or defect determination threshold values. Therefore, defects common to a plurality of chips due to a depiction failure of a depicting device are detected by die-to-database comparison. There can be provided detection performance which has not been achieved by a conventionally single functioning machine using die-to-database comparison and die-to-die comparison such as detection by die-to-die comparison, of a defect in which detection sensitivity is hardly improved in a database comparison scheme such as a line width failure of a fine pattern.

Figure 12:
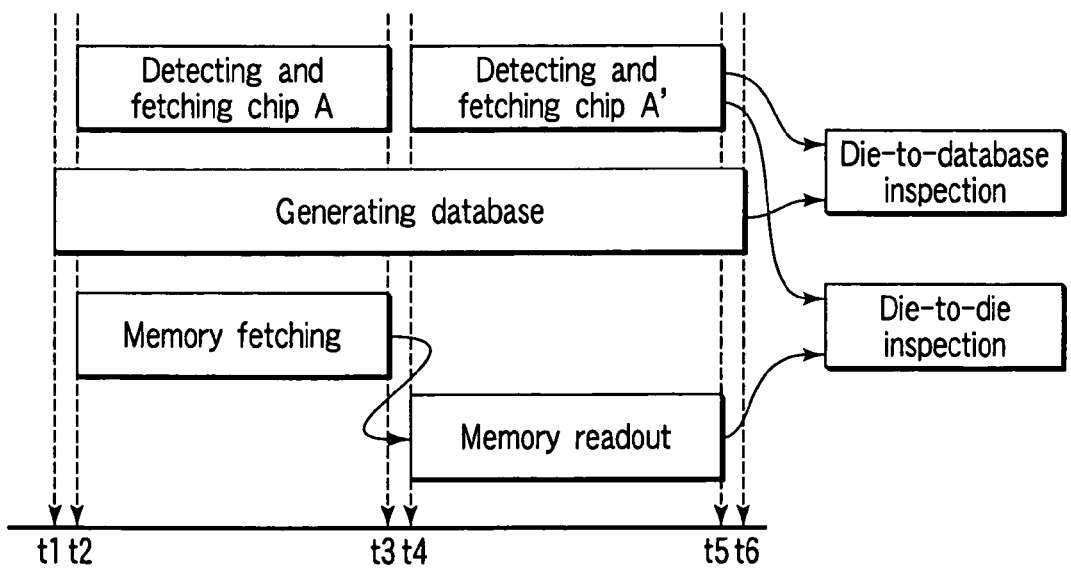
FIG. 12 is a timing chart for explaining a process for one inspection stripe according to the third embodiment.

FIG. 12 is a timing chart for explaining a process for one inspection stripe in the inspecting apparatus of the present embodiment. In a chip configuration of a mask illustrated here, as shown in FIG. 3, it is assumed that two chips are allocated in an inspection stripe lengthwise direction (X direction). Further, the illustrated stripe is specified so as to be die-to-die inspected in advance, and in a die extraction process before starting inspection as well, it has been inspected that die-to-die inspection can be carried out.

A region capable of die-to-die inspection is between t4 and t5. Die-to-database inspection is carried out over all periods from time t1 to t6. Die-to-database inspection starts from time t1, and a detection image of chip A is fetched in the pattern memory 30 from when time t2 has been reached. Since, at time t3, a unit called dicing of a boundary of chip A is reached, fetching into the pattern memory 30 is completed. For the purpose of die-to-die inspection at time t4, the detection image of chip A' is inputted to the die-to-die comparator circuit 18b, and the detection pattern image for chip A is read out from the pattern memory 30, and then inputted to the die-to-die comparator circuit 18b.

At a gap unit between dies, a timing of generation of a sensor scan pulse is adjusted, and a relationship between an image pixel position and a pattern position is established on a chip by chip basis. Accordingly, at the reference data side for die-to-database comparison as well, data expansion is carried out from design data in image pixels coincident with the above. As in die-to-die comparison, upon comparison in the comparator circuit, die-to-pixel position alignment can be eliminated.

If design data can be utilized, an allocation state of chip required for die-to-die inspection, the number of chip configurations, chip dimensions, a repetition pitch and the like are read from such information, and inspection can be automatically started. Even without the operator's teaching, calibration, alignment, or die-to-die inspection can be automatically carried out.

Modified Example

The present invention is not limited to the above described embodiments. The foregoing description gives a method for aligning the start coordinate of each die with a phase of timing of a sensor scan pulse. According to the spirit of the present invention, a phase of a mesh of a sensor image must not always coincide with the start coordinate of a die. Assuming that the start coordinate of a first die has started at a just center of a sensor image, it is sufficient to adjust a timing at the start point of a second die so as to be at a just center of an image pixel. That is, a phase with respect to a first image pixel is recorded, and such a phase may be controlled so as to be reproduced in second and subsequent dies.

The above-described embodiments each describe a case in which die-to-die comparison is carried out by one photographing means. However, even in the case where two photographing means are provided, and there cannot be employed a technique for finely adjusting an optical axis of each of the two photographing means, the scheme of the present invention can be applied. Namely, when it is difficult to mechanically make the optical axes of the respective photographing means coincident with each other on an image pixel by pixel basis, means for adjusting a timing of a sensor scan pulse is provided at one acquiring means, whereby a sensor scan pulse may be generated according to a coordinate of such die.

If detection is carried out to acquire measurement pattern data, reflection light may be used without being always limited to transmission light. Further, both of the transmission light and reflection light may be used at the same time. A light source for use in inspection is not limited to light, and an electron beam can be used. When the electron beam has been used as a light source, a secondary electron may be detected instead of the reflection light or transmission light.

In addition, a sample is not always limited to a photo mask. The present invention can be applied to defect inspection of a very small pattern formed on a semiconductor substrate, a liquid crystal substrate or the like.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A pattern inspecting method, comprising:
   preparing a sample having first and second inspection regions and an imaging device having a plurality of pixels;
   scanning the first inspection region to a first direction using the imaging device to obtain a first measurement pattern representing at least parts of the first inspection region;
   scanning the second inspection region to the first direction using the imaging device to obtain a second measurement pattern representing at least parts of the second inspection region;
   comparing the first measurement pattern and the second measurement pattern with each other to determine presence or absence of a defect formed on the sample; and
   controlling a scanning condition for scanning the second inspection region by the imaging device so as to keep the same with the scanning condition when the first inspection region is scanned by the imaging device.

2. The method of claim 1, wherein the scanning condition is a positional relationship of pixels of the imaging device and the pattern of the first or second inspection region.

3. The method of claim 1, wherein the pattern is an edge of the first or second inspection region.

4. The method of claim 3, further comprising:
storing a positional relationship of pixels of the imaging device and the edge of the first inspection region when the edge of the first inspection region is scanned.

5. The method of claim 4, wherein the step of storing stores a positional difference between the edge of the first inspection region and the pixel of the imaging device as the positional relationship.

6. The method of claim 1, wherein the pixels of the imaging device are arranged in a line which is orthogonal to the first direction.

7. The method of claim 1, wherein the first measurement pattern contains a plurality of first image portions in the first inspection region, and the second measurement pattern contains a plurality of second image portions in the second inspection region.

8. The method of claim 1, further comprising:
generating reference pattern data corresponding to the measurement pattern data from design data used when a pattern is formed on the sample; and
comparing the first and second measurement pattern data and the reference pattern data with each other to determine presence or absence of a defect of the pattern formed on the sample.

9. A pattern inspecting apparatus comprising:
an emitting unit configured to emit to a sample having a first inspection region on which a first pattern is formed and a second inspection region on which a second pattern is formed;
an imaging device that has at least one detecting unit that detects images from the sample;
a scanning unit configured to scan the first and second inspection regions to a first direction using the imaging device to obtain first and second measurement patterns representing at least parts of the first and second inspection regions;
a comparing unit configured to compare the first measurement pattern and the second measurement pattern with each other to determine presence or absence of a defect formed on the sample;
a position recognizing unit configured to recognize a position of the sample with respect to the detecting unit;
a signal output unit configured to output a relative signal according to a relative movement between the sample and the detecting unit; and
a control unit configured to control a scanning condition for scanning the second inspection region by the imaging device so as to keep the same with the scanning condition when the first inspection region is scanned by the imaging device.

10. The pattern inspecting apparatus of claim 9, wherein the pixels of the detecting unit are arranged in a line and in a direction orthogonal to the scanning direction.

11. The pattern inspecting apparatus of claim 9, wherein the emitting unit is configured to emit one of a light beam and an electron beam.

12. The pattern inspecting apparatus of claim 9, wherein the detecting unit including pixels that detect images from the samples; one of reflection light, transmission light and a secondary electron.

13. The pattern inspecting apparatus of claim 9, further comprising:
a storing unit configured to store a positional relationship of pixels of the detecting unit and an image from the samples.

14. The pattern inspecting apparatus of claim 13, wherein the signal output unit output the relative signals every given time.

15. The pattern inspecting apparatus of claim 13, wherein the signal output unit outputs the relative signal whenever the sample moves by a predetermined distance relatively with respect to the detecting unit.

16. The pattern inspecting apparatus of claim 9, further comprising:
a reference data generating unit configured to generate reference pattern data corresponding to the measurement pattern data from design data used when a pattern is formed on the sample; and
a die-to-data determination unit configured to compare an image obtained from the first and second inspection regions and the reference pattern data with each other to determine presence or absence of a defect of the pattern formed on the sample.

17. The pattern inspecting apparatus of claim 9, wherein the signal output unit outputs the relative signal on a predetermined timing while the detecting unit detects one of the reflection light, the transmission light and the secondary electron from the first and second inspection regions.

* * * * *